(12) United States Patent
Zhang et al.

(10) Patent No.: US 11,449,807 B2
(45) Date of Patent: Sep. 20, 2022

(54) SYSTEMS AND METHODS FOR BOOTSTRAPPED MACHINE LEARNING ALGORITHM TRAINING

(71) Applicant: Walmart Apollo, LLC, Bentonville, AR (US)

(72) Inventors: Jingsi Zhang, San Jose, CA (US); Xuan Cao, Santa Clara, CA (US); Lu Wang, Sunnyvale, CA (US); Wei Shen, Pleasanton, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 364 days.

(21) Appl. No.: 16/779,382

(22) Filed: Jan. 31, 2020

(65) Prior Publication Data

US 2021/0241181 A1    Aug. 5, 2021

(51) Int. Cl.
*G06N 20/20* (2019.01)
*G06N 5/04* (2006.01)

(52) U.S. Cl.
CPC .............. *G06N 20/20* (2019.01); *G06N 5/04* (2013.01)

(58) Field of Classification Search
None
See application file for complete search history.

(56) References Cited

U.S. PATENT DOCUMENTS

| | | |
|---|---|---|
| 8,175,950 B1 | 5/2012 | Grebeck et al. |
| 8,346,607 B1 | 1/2013 | Benson |
| 8,473,347 B1 | 6/2013 | Koningstein |
| 8,706,548 B1 | 4/2014 | Blume et al. |
| 8,768,766 B2 | 7/2014 | Ellis et al. |
| 9,407,651 B2 | 8/2016 | Mathis |
| 10,068,247 B2 | 9/2018 | Xu et al. |
| 10,497,034 B2 | 12/2019 | Yang et al. |

(Continued)

FOREIGN PATENT DOCUMENTS

WO    2015020897    2/2015

OTHER PUBLICATIONS

Shi, Lihui, et al. Predict the Click-Through Rate and Average Cost Per Click for Keywords Using Machine Learning Methodologies. 2016 International Conference on Industrial Engineering and Operations Management, Detroit, Sep. 23-25, 2016. IEOM Society International. (Year: 2016) Sep. 23, 2016.

(Continued)

*Primary Examiner* — Brian Whipple
(74) *Attorney, Agent, or Firm* — Bryan Cave Leighton Paisner LLP

(57) ABSTRACT

Systems and methods including one or more processors and one or more non-transitory storage devices storing computing instructions configured to run on the one or more processors and perform receiving a request for a machine learned prediction for an item; determining that a number of entries in item user interaction data of the item is below a predetermined number-of-entries threshold; incorporating category interaction data of a hierarchical category of the item from a predetermined time period into the item user interaction data of the item; determining an initial machine learned prediction for the item using at least the category interaction data, as incorporated into the item user interaction data; and facilitating altering a graphical user interface (GUI) of an electronic device using the initial machine learned prediction for the item. Other embodiments are disclosed herein.

20 Claims, 7 Drawing Sheets

(56) References Cited

U.S. PATENT DOCUMENTS

| | | |
|---|---|---|
| 2001/0047297 A1 | 11/2001 | Wen |
| 2003/0120662 A1 | 6/2003 | Vishik |
| 2004/0103024 A1 | 5/2004 | Patel |
| 2004/0186776 A1 | 9/2004 | Llach |
| 2005/0027594 A1 | 2/2005 | Yasnovsky |
| 2005/0043998 A1 | 2/2005 | Bross |
| 2006/0004628 A1 | 1/2006 | Toe |
| 2006/0129453 A1 | 6/2006 | Gardner |
| 2006/0173744 A1 | 8/2006 | Kandasamy et al. |
| 2006/0248035 A1 | 11/2006 | Gendler et al. |
| 2006/0271426 A1 | 11/2006 | Borgs |
| 2007/0157245 A1 | 7/2007 | Collins |
| 2007/0192190 A1 | 8/2007 | Granville |
| 2007/0233556 A1 | 10/2007 | Koningstein |
| 2007/0288350 A1 | 12/2007 | Bykowsky |
| 2008/0103953 A1 | 5/2008 | Flake |
| 2008/0140489 A1 | 6/2008 | Berkhin et al. |
| 2008/0275770 A1 | 11/2008 | Kitts |
| 2009/0070211 A1 | 3/2009 | Gonen |
| 2009/0070212 A1 | 3/2009 | Gonen |
| 2009/0171721 A1 | 7/2009 | Lebaron et al. |
| 2009/0292677 A1 | 11/2009 | Kim |
| 2010/0082439 A9 | 4/2010 | Patel |
| 2010/0138291 A1 | 6/2010 | Silverman |
| 2010/0250332 A1 | 9/2010 | Ghosh |
| 2011/0035276 A1 | 2/2011 | Ghosh et al. |
| 2011/0040612 A1 | 2/2011 | Simmons et al. |
| 2011/0131099 A1 | 6/2011 | Sheilds |
| 2011/0231264 A1 | 9/2011 | Dilling |
| 2012/0084141 A1 | 4/2012 | Quinn et al. |
| 2013/0197996 A1 | 8/2013 | Dunham et al. |
| 2014/0006172 A1 | 1/2014 | Pardoe |
| 2014/0122221 A1 | 5/2014 | Jordan |
| 2014/0195339 A1 | 7/2014 | Paulsen et al. |
| 2014/0200995 A1 | 7/2014 | Siegman et al. |
| 2014/0379464 A1 | 12/2014 | Aronowich et al. |
| 2015/0081425 A1 | 3/2015 | Siegman et al. |
| 2016/0132926 A1 | 5/2016 | Zimmerman, Jr. et al. |
| 2016/0217490 A1 | 7/2016 | Malik et al. |
| 2016/0239869 A1 | 8/2016 | Wong |
| 2016/0267519 A1 | 9/2016 | Pai et al. |
| 2016/0292714 A1 | 10/2016 | Bhalgat |
| 2016/0379243 A1 | 12/2016 | Kalish |
| 2016/0379244 A1 | 12/2016 | Kalish |
| 2017/0083965 A1 | 3/2017 | Sun |
| 2017/0098236 A1 | 4/2017 | Lee et al. |
| 2017/0216254 A1 | 7/2017 | Bhalgat |
| 2017/0222940 A1 | 8/2017 | O'Kelley |
| 2018/0005314 A1 | 1/2018 | Li et al. |
| 2018/0053220 A1 | 2/2018 | Bhalgat |
| 2018/0204250 A1 | 7/2018 | Watine |
| 2019/0034978 A1 | 1/2019 | Karthik |
| 2021/0150582 A1 | 5/2021 | Wang et al. |
| 2021/0150584 A1 | 5/2021 | Volkovich |

OTHER PUBLICATIONS

Liu, Mengjuan, et al. "An Effective Budget Management Framework for Real-Time Bidding in OneLine Advertising." IEEE Access, vol. 8, Jan. 30, 2020. (Year: 2020) Jan. 30, 2020.

Cheng, Haibin, et al. "Multimedia Features for Click Prediction of New Ads in Display Advertising." KDD 2012, Aug. 12-16, 2012, Beijing, China. Copyright ACM. (Year: 2012) Aug. 8, 2012.

Zhou, et al., "Finding Needle in a Million Metrics: Anomaly Detection in a Large-Scale Computational Advertising Platform," TargetAd 2016: 2nd International Workshop on Ad Targeting at Scale, WSDM, Feb. 22-25, 2016, arXiv:1602.07057v1 [cs.AI] Feb. 23, 2016, https://arxiv.org/abs/1602.07057, pp. 1-6, 2016. 2016.

Sritharan, "Using Machine Learning to Optimize Ad Campaign Performance and Budgets," https:// https://softcrylic. com/blogs/using-machine-learning-to-optimize-ad-campaign-performance-and-budgets/#, pp. 1-5, Accessed Nov. 18, 2020. 2020.

SYSTEMS AND METHODS FOR BOOTSTRAPPED MACHINE LEARNING ALGORITHM TRAINING

TECHNICAL FIELD

This disclosure relates generally to training machine learning algorithms and more specifically to bootstrapped training regimens for machine learning algorithms.

BACKGROUND

Machine learning algorithms (e.g., unsupervised learning, deep learning, supervised learning, etc.) are becoming more commonplace in today's computer systems, but many data scientists and software engineers continue to encounter problems while training novel algorithms. One problem encountered when training machine learning algorithms is a lack of adequate amounts of representative training data. Machine learned algorithms trained on problematic training data suffer from a number of flaws. For example, machine learned algorithms trained on an insufficient amount of data can be inaccurate and, depending on the content of the training data, can overpredict or underpredict outcomes. Further, machine learned algorithms trained on non-representative training data can be skewed due to a unique event in the training data. These inaccuracies can also pose problems for machine learned algorithms used for automatic purchases (e.g., automated trading algorithms, search engine marketing algorithms, etc.), as a severely overpredicted outcome can lead to recurring overpayments.

In the past, solutions to this problem of poor or insufficient amounts of training data have been to (1) gather more training data, (2) purchase higher quality training data sets from a vendor, or (3) use a pre-trained model. Each of these past solutions had their own limitations. In many instances, gathering more training data can be time consuming due to the large corpus of embeddings need to accurately train a machine learning model. Purchasing training data can also pose problems, as these training datasets can be expensive and can become outdated quickly. The disadvantages of pre-trained models are similar to those seen with purchased training data, as pre-trained models can also be expensive when they are bespoke and can become outdated quickly without updating or re-training. Further, embeddings that have not been seen before by a model or are new can be misclassified by a model (pre-trained or not) due to a lack of representation in training data (either gathered or purchased). Therefore, there is a need for a system and method to bootstrap training of a machine learning algorithm.

BRIEF DESCRIPTION OF THE DRAWINGS

To facilitate further description of the embodiments, the following drawings are provided in which.

Figure 1:
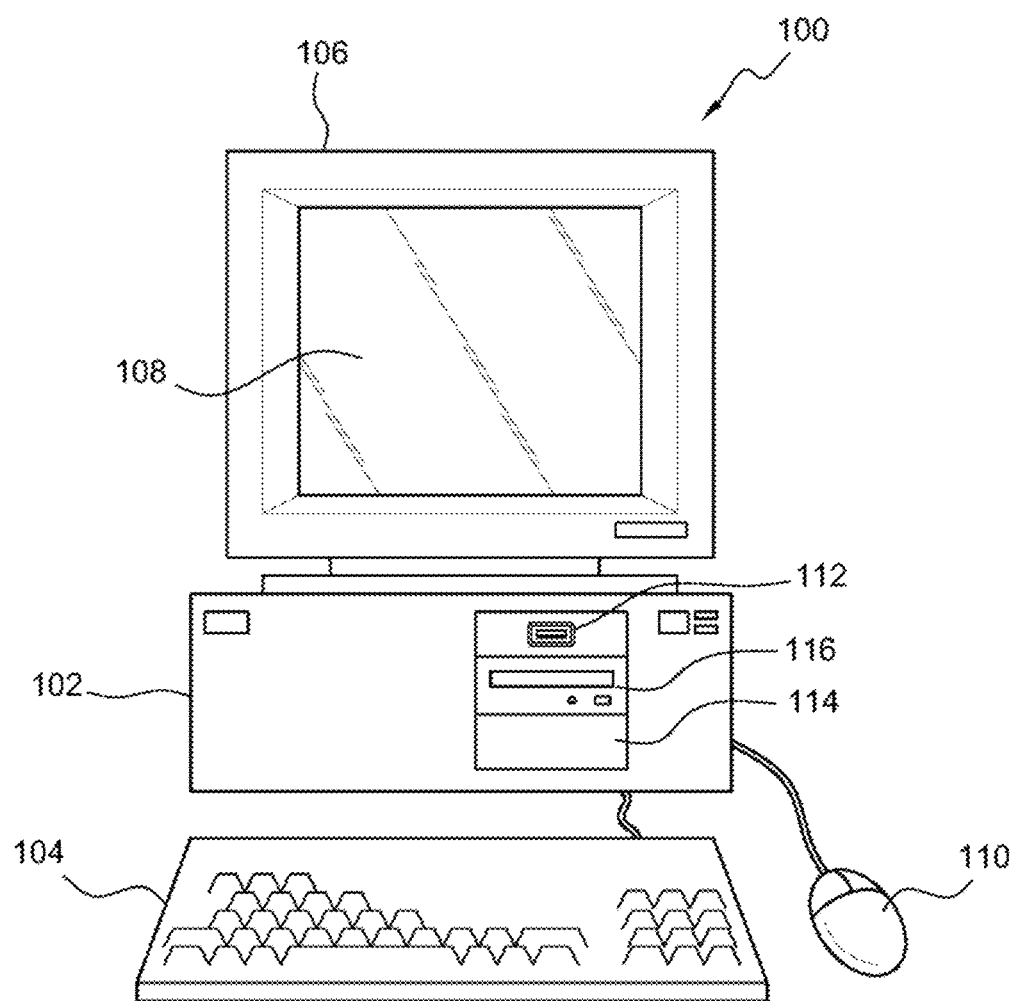
FIG. 1 illustrates a front elevational view of a computer system that is suitable for implementing various embodiments of the systems disclosed in FIGS. 3 and 7-9.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Systems and methods are provided herein to bootstrap training of machine learning algorithms, in many embodiments, without obtaining new training data or purchasing a pre-trained model.

A number of embodiments can include a system. The system can include one or more processors and one or more non-transitory computer-readable storage devices storing computing instructions. The computing instructions can be configured to run on the one or more processors and perform receiving a request for a machine learned prediction for an item; determining that a number of entries in item user interaction data of the item is below a predetermined number-of-entries threshold; incorporating category interaction data of a hierarchical category of the item from a predetermined time period into the item user interaction data of the item; determining an initial machine learned prediction for the item using at least the category interaction data, as incorporated into the item user interaction data; and facilitating altering a graphical user interface (GUI) of an electronic device using the initial machine learned prediction for the item. Other embodiments are disclosed herein.

Various embodiments include a method. The method can be implemented via execution of computing instructions configured to run at one or more processors and configured to be stored at non-transitory computer-readable media The method can comprise receiving a request for a machine learned prediction for an item; determining that a number of entries in item user interaction data of the item is below a predetermined number-of-entries threshold; incorporating category interaction data of a hierarchical category of the item from a predetermined time period into the item user interaction data of the item; determining an initial machine learned prediction for the item using at least the category interaction data, as incorporated into the item user interaction data; and facilitating altering a graphical user interface (GUI) of an electronic device using the initial machine learned prediction for the item. Other embodiments are disclosed herein.

Figure 2:
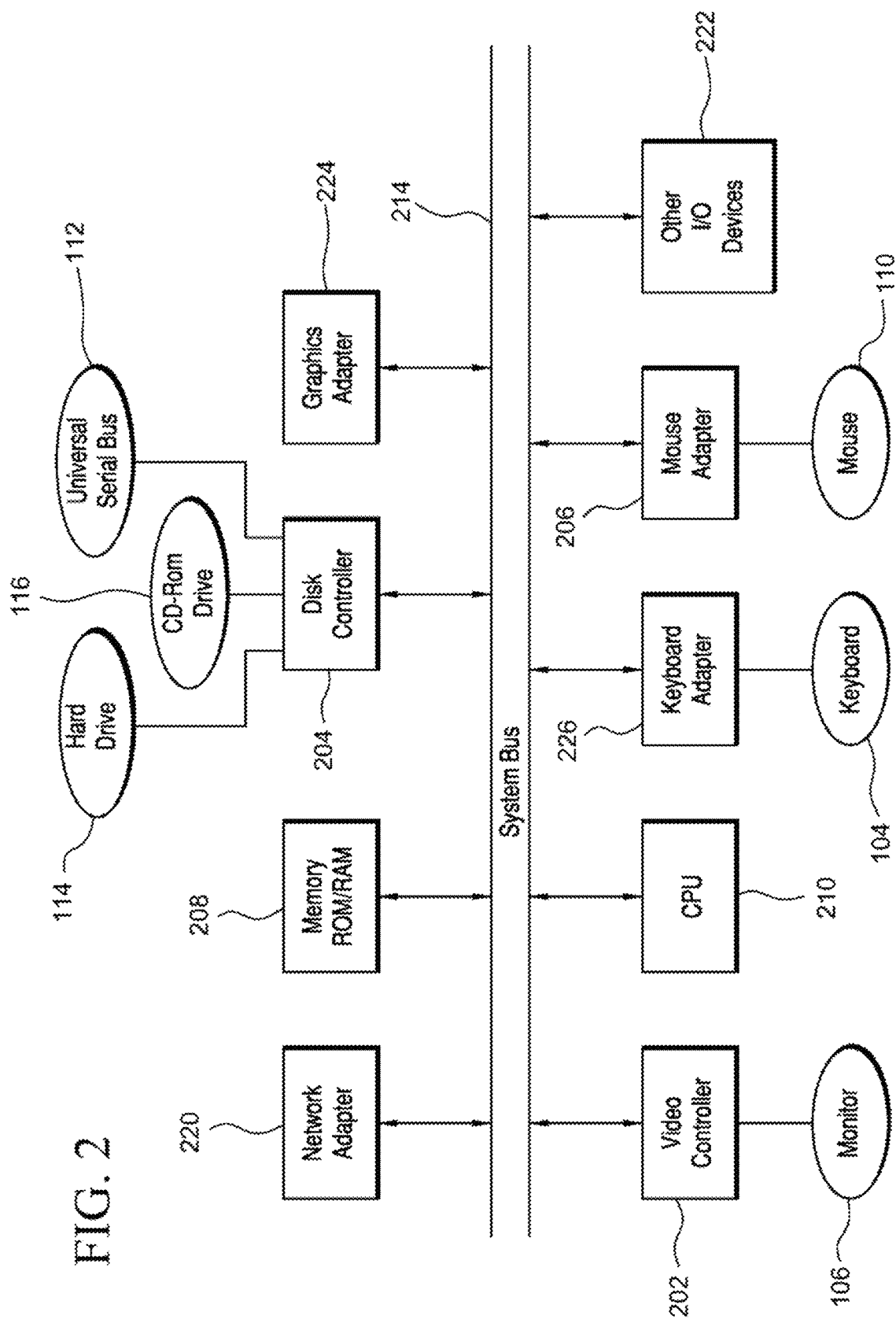
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
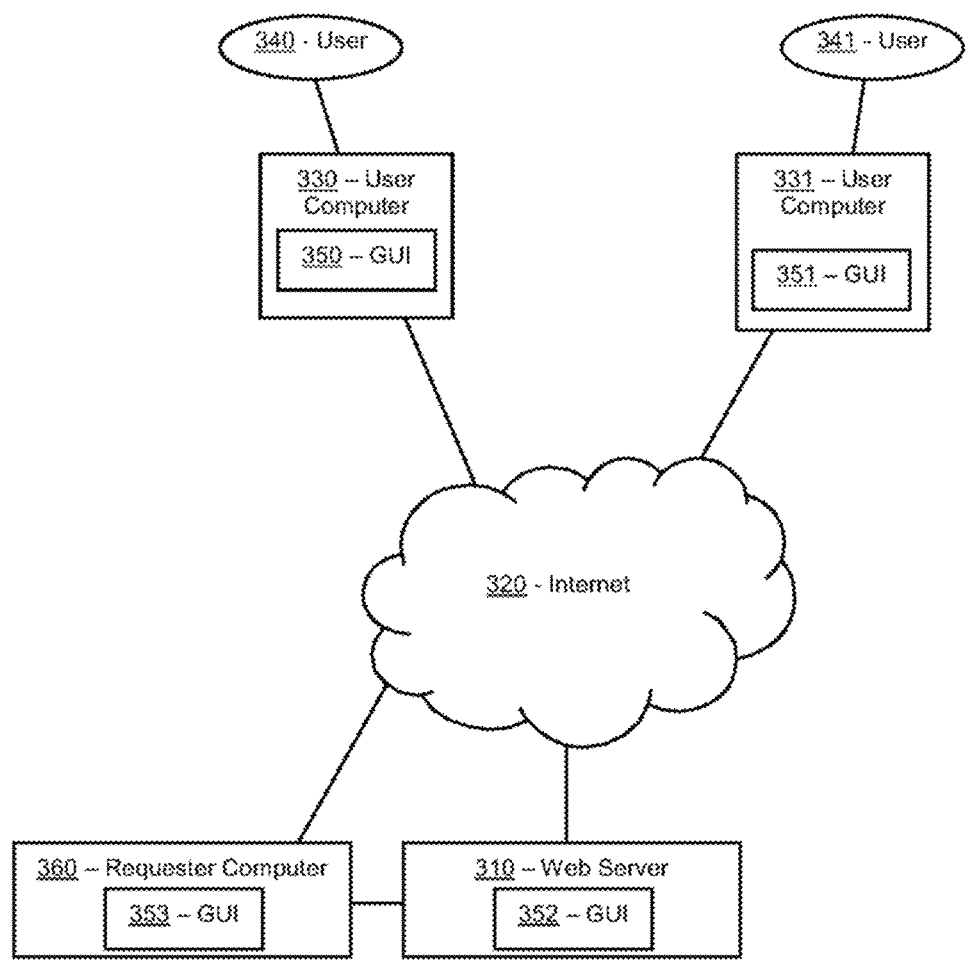
FIG. 3 illustrates a representative block diagram of a system, according to an embodiment.

Turning ahead in the drawings, FIG. 3 illustrates a block diagram of a system 300 that can be employed for bootstrapped machine learning algorithm training, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a web server 310 and/or requester computer 360. Web server 310 and/or requester computer 360 and/or requester computer 360 can be a computer system, such as computer system 100 (FIG. 1), as described above, and can each be a single computer, a single server, or a cluster or collection of computers or servers, or a cloud of computers or servers. In another embodiment, a single computer system can host each of two or more of web server 310 and/or requester computer 360 and/or requester computer 360. Additional details regarding web server 310 and/or requester computer 360 and/or requester computer 360 are described herein.

In many embodiments, system 300 also can comprise user computers 340, 341. User computers 340, 341 can comprise any of the elements described in relation to computer system 100. In some embodiments, user computers 340, 341 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In many embodiments, system 300 can comprise graphical user interface ("GUI") 350, 351, 352, 353. In the same or different embodiments, GUI 350, 351, 352, 353 can be part of and/or displayed by user computers 340, 341, web server 310, and requester computer 360, respectively, each of which also can be part of system 300. In another embodiment, user computers 340, 341 are not party of system 300. In various embodiments, GUI 350, 351, 352, 353 can be part of and/or displayed by webserver 310. In some embodiments, GUI 350, 351, 352, 353 can comprise text and/or graphics (image) based user interfaces. In the same or different embodiments, GUI 350, 351, 352, 353 can comprise a heads up display ("HUD"). When GUI 350, 351, 352, 353 comprises a HUD, GUI 350, 351, 352, 353 can be projected onto glass or plastic, displayed in midair as a hologram, or displayed on monitor 106 (FIG. 1). In various embodiments, GUI 350, 351, 352, 353 can be color or black and white. In many embodiments, GUI 350, 351, 352, 353 can comprise an application running on a computer system, such as computer system 100, user computers 340, 341 server computer 310, and/or requester computer 360. In the same or different embodiments, GUI 350, 351, 352, 353 can comprise a website accessed through internet 320. In some embodiments, GUI 350, 351, 352, 353 can comprise an eCommerce website. In these or other embodiments, GUI 350, 351, 352, 353 can comprise an administrative (e.g., back end) GUI allowing an administrator to modify and/or change settings in system 300. In the same or different embodiments, GUI 350, 351, 352, 353 can be displayed as or on a virtual reality (VR) and/or augmented reality (AR) system or display.

In some embodiments, web server 320 can be in data communication through Internet 320 with user computers (e.g., 340, 341). In certain embodiments, user computers 340, 341 can be desktop computers, laptop computers, smart phones, tablet devices, and/or other endpoint devices. Web server 320 can host one or more websites. For example, web server 320 can host an eCommerce web site that allows users to browse and/or search for products, to add products to an electronic shopping cart, and/or to purchase products, in addition to other suitable activities.

In many embodiments, web server 310 and/or requester computer 360 and/or requester computer 360 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) web server 310 and/or requester computer 360 and/or requester computer 360 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of web server 310 and/or requester computer 360 and/or requester computer 360. In a similar manner, the processing module(s) and the memory storage module(s) can be local and/or remote to each other.

In many embodiments, web server 310 and/or requester computer 360 and/or requester computer 360 can be configured to communicate with one or more user computers 330 and 331. In some embodiments, user computers 330 and 331 also can be referred to as customer computers. In some embodiments, web server 310 and/or requester computer 360 and/or requester computer 360 can communicate or interface (e.g., interact) with one or more customer computers (such as user computers 330 and 331) through a network or Internet 320. Internet 320 can be an intranet that is not open to the public. Accordingly, in many embodiments, web server 310 and/or requester computer 360 and/or requester computer 360 (and/or the software used by such systems) can refer to a back end of system 300 operated by an operator and/or administrator of system 300, and user computers 330 and 331 (and/or the software used by such systems) can refer to a front end of system 300 used by one or more users 340, 341, respectively. In some embodiments, users 340, 341 can also be referred to as customers, in which case, user computers 340, 341 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, web server 310 and/or requester computer 360 and/or requester computer 360 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, IBM DB2 Database, and/or NoSQL Database.

Meanwhile, communication between web server 310 and/or requester computer 360 and/or requester computer 360, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

In many embodiments, the techniques described herein can provide a practical application and several technological improvements. In some embodiments, the techniques described herein can allow for training of a machine learning algorithm to make predictions for embeddings with little or no training data. These techniques described herein can provide a significant technical improvement over conventional approaches of training a machine learning algorithm, such as arduously gathering training data, purchasing an expensive corpus of training data, and/or using a pertained model. In various embodiments, the techniques described herein can beneficially make determinations based on dynamic information that describes current conditions and/or conditions that have occurred during the same day of a request for a machine learned prediction. In this way, the techniques described herein can avoid problems with stale and/or outdated machine learned models by continually updating.

In a number of embodiments, the techniques described herein can solve a technical problem that arises only within the realm of computer networks, as machine learning algorithms do not exist outside the realm of computer networks.

Figure 4:
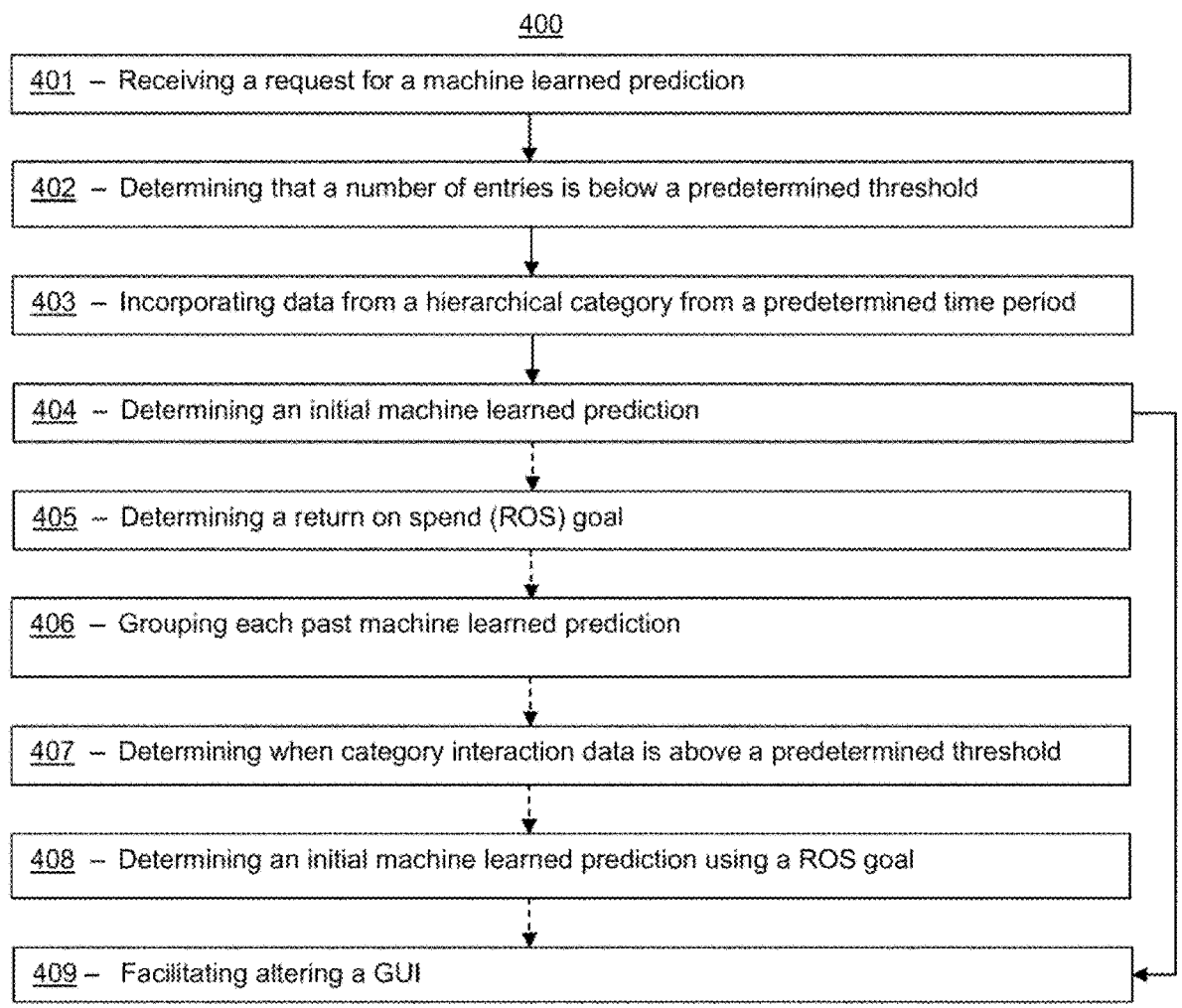
FIG. 4 illustrates a flowchart for a method, according to certain embodiments.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules. Such non-transitory memory storage modules can be part of a computer system such as web server 310 and/or requester computer 360 and/or requester computer 360 (FIG. 3). The processing module(s) can be similar or identical to the processing module(s) described above with respect to computer system 100 (FIG. 1).

In many embodiments, method 400 can comprise an activity 401 of receiving a request for a machine learned prediction. In some embodiments, a machine learned prediction can comprise an output of a machine learning algorithm. In various embodiments, a machine learning algorithm can comprise a mathematical (e.g., statistical) model used by computer systems (e.g., system 100 (FIG. 1) and/or system 300 (FIG. 3)) to perform a task using patterns and/or inferences. In many embodiments, a task performed by a machine learning algorithm can comprise bidding on a search engine keyword advertisement and/or trading securities. In some embodiments, a requester can request a machine learned prediction for a task via a requester computer 360 (FIG. 3). In embodiments where a request is received from the requester computer 360 (FIG. 3), the requester can submit it via GUI 353 (FIG. 3). In various embodiments, automated systems can request a machine learned prediction upon occurrence of a pre-determined event. In many embodiments, a predetermined event can occur periodically (e.g., daily, weekly, monthly, every other day, every third day, etc.) or can occur when certain conditions are met (e.g., a price of a security reaches a certain value or when a return on spend metric falls below a certain threshold. In some embodiments, a request for a machine learned prediction can be for an item. In these or other embodiments, an item can comprise a product for sale on an eCommerce website, a keyword related to the product for sale on the eCommerce website, or a security traded on an electronic exchange system. In various embodiments, an item can have insufficient interaction data to determine a traditional machine learned prediction. For example, under 10 interactions. In these or other embodiments, an item can be a new item with no interaction data.

In many embodiments, method 400 can comprise an activity 402 of determining that a number of entries is below a predetermined threshold. In some embodiments, a number of entries can comprise a number of interactions with an item. In some embodiments, an interaction with an item can comprise a purchase of an item after a user has viewed the item, a click (or its equivalent on a touch screen device or VR/AR system) of the item after the user has viewed the item, a view of the item without the click by the user. In these or other embodiments, a purchase ratio comprising a number of views without a click to a number of purchases (or vice versa) can be used. In various embodiments, a click ratio comprising a number of views without a click to a number of views with a click (or vice versa) can be used. In these or other embodiments, add to cart, returns, and/or cancellations of an item can be used. In many embodiments, a predetermined threshold can comprise a predetermined number-of-entries threshold. In these embodiments, a predetermined number-of-entries threshold can comprise a minimum number of interactions with an item, as described above. In these or other embodiments, a number of entries in item user interaction data can be determined to be above, below, or equal to a predetermined number-of-entries threshold. In these or other embodiments, a predetermined number-of-entries threshold can be set by an administrator of system 300 (FIG. 3).

In many embodiments, method 400 can comprise an activity 403 of incorporating data from a hierarchical category from a predetermined time period. In various embodiments, activity 403 can be performed in response to completion of activity 402. In some embodiments, a hierarchical category can comprise level in a hierarchical categorization. In the same or different embodiments, the hierarchical categorization can comprise levels of an item taxonomy. In many embodiments, an item taxonomy can be configured to classify a catalogue of items based on properties of each item of the catalogue of items. In the same or different embodiments, properties of an item can comprise a title, a description, a price, a brand, a manufacturer, a color, a quantity, a volume, a weight, a material, a style, a pattern, a theme, a recommended use, a color, a fabric, etc. In some embodiments, an item taxonomy can comprise distinct levels of item classification. In further embodiments, distinct levels of item classification can narrow as the distinct levels go deeper into an item taxonomy. In various embodiments, distinct levels of item classification can comprise a super department, a department, a category, and/or a sub-category. In many embodiments, a department can be deeper in an item taxonomy than a super department. In the same or different embodiments, a category can be deeper in an item taxonomy than a department. In some embodiments, a sub-category can be deeper in an item taxonomy than a category. For example, an item taxonomy for Shamrock Farms whole milk can comprise a super department of "Eggs and Dairy," a department of "Milk," a category of "Dairy Milk," and a sub-category of "Whole Milk." As another non-limiting example, an item taxonomy for a sofa can comprise a super department of "Home," a department of "Furniture and Appliances," a category of "Living Room," and a sub-category of "Sofas and Sectionals." In both examples described above, the item taxonomy can be further segmented into brand/manufacturer if needed. In many embodiments, an item taxonomy can be received from a computer administered from or by system 300 (FIG. 3). In these or other embodiments, an item taxonomy can be received from a third party system or vendor.

In many embodiments, data from a hierarchical category can comprise item interaction data, as described above. In these or other embodiments, item interaction data can be incorporated from a broader hierarchical category, the same hierarchical category, and/or a narrower hierarchical category than a hierarchical category of an item. In various embodiments, item interaction data for a predetermined period of time can be incorporated. In some embodiments, a predetermined period of time can be updated and/or changed periodically (e.g., daily, weekly, monthly, every other day, every third day, etc.). In many embodiments, a predetermined period of time can be rolling (e.g., advance continually and time progresses). In some embodiments, a predetermined period of time can comprise 4 weeks. In various embodiments, data from a hierarchical category can be incorporated into data of an item, as described above.

In many embodiments, method 400 can comprise an activity 404 of determining an initial machine learned prediction. In some embodiments, a machine learned prediction can be made using interaction data as described in activities 402-403. In many embodiments, method 400 can optionally comprise activity 405 of determining a return on spend (ROS) goal. In various embodiments, activity 405 can be performed as a part of or immediately after activity 404. In these or other embodiments, ROS can comprise a metric configured to represent a return on an investment. For example, return on advertising spend (ROAS) is a ROS metric. ROAS can be an amount of revenue a company receives for every dollar spent on an advertising source (e.g., search engine advertising). As another example, customer acquisition cost (CAC) is a ROS metric. CAC can be calculated by dividing all the costs spent on acquiring more customers (e.g., marketing expenses) by a number of customers acquired in a time period. In the context of search engine marketing, CAC can be determined on a per advertisement basis using various user tracking techniques (e.g., tracking views of a website originating from an advertisement, cookies, account information, etc.). In many embodiments, a ROS goal can be set differently depending on the hierarchical category an item is categorized in. For example, a ROS can be set globally at a division level in a hierarchical categorization. In some embodiments, a ROS goal can be set by an administrator of system 300 (FIG. 3).

In many embodiments, method 400 can optionally comprise an activity 406 of grouping each past machine learned prediction. In some embodiments, past machine learned predictions can be grouped using a cost and/or a percentage of a maximum cost. In some embodiments, past machine learned predictions can be grouped into at least one group. In these or other embodiments, past machine learned predictions can be grouped into 10 groups. For example, machine learned predictions can be divided into the following groups when a max cost is $1.00 and/or when a percentage of cost is used: [0.05, 0.1], (0.1, 0.2], (0.2, 0.3], . . . , (0.9,1.0]. In some embodiments, past machine learned prediction can be machine learned prediction of items in a hierarchical category incorporated in activity 403. In these or other embodiments, past machine learned predictions can have been made during the predetermined time period. In many embodiments, groups of past machine learned bids can be used to determine an initial machine learned bid using a ROS goal. For example, a ROS can be calculated for reach respective group, and an initial bid can be selected from a group having a ROS above the ROS goal.

In many embodiments, method 400 can optionally comprise an activity 407 of determining when category interaction data is above a predetermined threshold. In some embodiments, category interaction data can comprise data incorporated from a hierarchical category, as incorporated in activity 403. In these or other embodiments, category interaction data as determined in activity 408 can comprise total category interaction data. In these embodiments, total category interaction data can comprise a sum of all interactions with an item (e.g., total clicks of an item over all browse sessions). In many embodiments, a predetermined threshold can comprise a predetermined category-interaction-data threshold. In these embodiments, a predetermined category-interaction-data threshold can comprise a minimum number of interactions with items from a hierarchical category, as incorporated in activity 403. In these or other embodiments, a number of entries in category interaction data can be determined to be above, below, or equal to a predetermined category-interaction-data threshold. In these or other embodiments, a predetermined category-interaction-data threshold can be set by an administrator of system 300 (FIG. 3). In many embodiments, when a number of entries in category interaction data is below a predetermined category-interaction-data threshold, interaction data from hierarchical categories can be incorporated into the category until the number of entries in the category is above the predetermined category-interaction-data threshold. In these embodiments, incorporation can substantially similar to incorporation described in activity 403.

In many embodiments, method 400 can optionally comprise an activity 408 of determining an initial machine learned prediction using a ROS goal. In some embodiments, an initial machine learned prediction can be for an item, as described in activity 401. In these or other embodiments, a ROS goal can be set by an administrator of system 300 (FIG. 3). In various embodiments, a ROS goal can be set as described in activity 405. In some embodiments, an initial machine learned prediction can be determined by determining an average machine learned prediction. In these embodiments, an average can be determined using machine learned predictions above a ROS goal. In some embodiments, the machine learned predictions can be machine learned predictions of items in a hierarchical category incorporated in activity 403. In these or other embodiments, the machine learned predictions can have been made during the predetermined time period, as described above. In many embodiments, an average machine learned prediction can be set as an initial machine prediction for an item.

In many embodiments, method 400 can comprise an activity 409 of facilitating altering a GUI. In some embodiments, the GUI can comprise GUI 350-353 (FIG. 3). In some embodiments, altering a GUI can comprise returning an initial machine learned prediction for an item. In these or other embodiments, an initial machine learned prediction can be returned to a requester computer 360 (FIG. 3). In various embodiments, an initial machine learned prediction can be displayed to a requester via GUI 353 (FIG. 3). In some embodiments, an initial machine learned prediction can be forwarded to a system configured to automatically bid on securities and/or a search engine keyword advertisement for an item. In these or other embodiments, a winning bid can be submitted, and facilitating altering a GUI can comprise transmitting a search engine advertisement for display. In these or other embodiments, a search engine advertisement can be displayed on one or more of user computers 330, 331(FIG. 3). In these or other embodiments, the search engine advertisement can be displayed on GUI 350, 351(FIG. 3).

Figure 5:
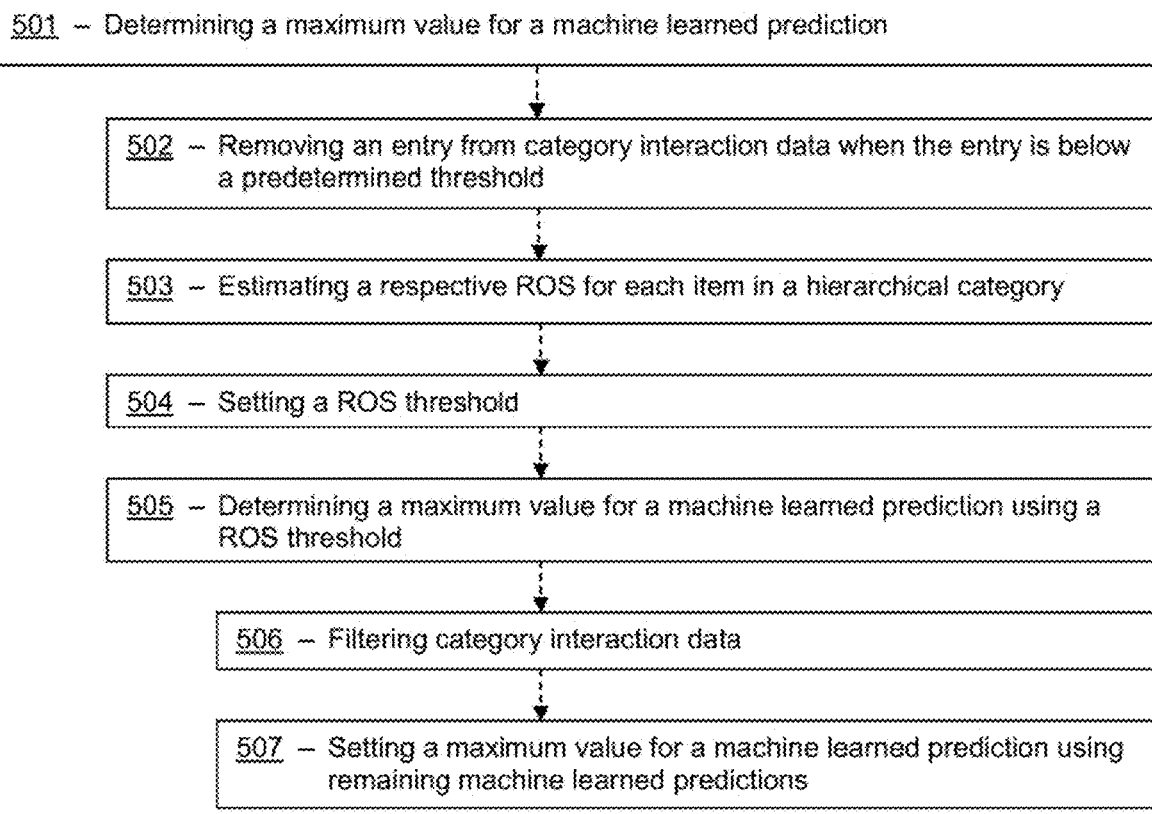
FIG. 5 illustrates a an additional flowchart for the method of FIG. 4, according to certain embodiments.

Turning ahead in the drawings, FIG. 5 illustrates an additional flow chart for method 400, according to an embodiment. In one embodiment, the activities in this additional flow chart for method 400 can be performed before activity 401 (FIG. 4). Method 400 (including the activities in both FIGS. 4 and 5) is merely exemplary and is not limited to the embodiments presented herein. Method 400 (including the activities in both FIGS. 4 and 5) can be employed in many different embodiments or examples not specifically depicted or described herein. In some embodiments, the activities of method 400 (including the activities in both FIGS. 4 and 5) can be performed in the order presented. In other embodiments, the activities of method 400 (including the activities in both FIGS. 4 and 5) can be performed in any suitable order. In still other embodiments, one or more of the activities of method 400 (including the activities in both FIGS. 4 and 5) can be combined or skipped. In many embodiments, system 300 (FIG. 3) can be suitable to perform method 400 (including the activities in both FIGS. 4 and 5) and/or one or more of the activities of method 400 (including the activities in both FIGS. 4 and 5). In these or other embodiments, one or more of the activities of method 400 (including the activities in both FIGS. 4 and 5) can be implemented as one or more computer instructions configured to run at one or more processing modules and configured to be stored at one or more non-transitory memory storage modules. Such non-transitory memory storage modules can be part of a computer system such as web server 310 and/or requester computer 360 and/or requester computer 360 (FIG. 3). The processing module(s) can be similar or identical to the processing module(s) described above with respect to computer system 100 (FIG. 1). In some embodiments, method 400 (including the activities in both FIGS. 4 and 5) can be performed in parallel, before, after, or as a part of method 400 (including the activities in both FIGS. 4 and 5). In various embodiments, one or more activities of method 400 (including the activities in both FIGS. 4 and 5) can be inserted into and/or combined with all of or portions of method 400 (including the activities in both FIGS. 4 and 5).

As described above, poorly trained machine learning algorithms and/or machine learning algorithms seeing new items can overpredict an outcome. The, in turn, can cause automated computer systems controlled by these algorithms to make errors due to the algorithm's poor predictive ability. Setting a maximum bid for a machine learned prediction is one way to solve this problem while avoiding at least one of the technical problems referenced above. Therefore, in many embodiments, method 400 can comprise an activity 501 of determining a maximum value for a machine learned prediction. In some embodiments, a machine learned prediction can comprise a machine learned prediction, as described in activity 401 (FIG. 4). In these or other embodiments, a maximum value for a machine learned prediction can be determined using category interaction data, as described in activities 402-403 (FIG. 4). In various embodiments, a maximum value for a machine learned prediction can be set differently depending on a hierarchical category an item is categorized in. For example, a maximum value for a machine learned prediction can be set globally at a division level in a hierarchical categorization. In some embodiments, a maximum value for a machine learned prediction can be set by an administrator of system 300 (FIG. 3).

In many embodiments, activity 501 can comprise optional activities 502, 503, 504, and 505. Accordingly, in many embodiments, method 400 can comprise an activity 502 of removing an entry from category interaction data when the entry is below a predetermined threshold. In many embodiments, a predetermined threshold can comprise an at-least-one-entry threshold. In these embodiments, a predetermined at-least-one-entry threshold can comprise a minimum number of interactions with items from a hierarchical category, as incorporated in activity 403 (FIG. 4). In these or other embodiments, a number of entries in category interaction data can be determined to be above, below, or equal to a predetermined at-least-one-entry threshold. In these or other embodiments, a predetermined at-least-one-entry threshold can be set by an administrator of system 300 (FIG. 3). In many embodiments, when a number of entries in category interaction data for an item is below a predetermined at-least-one-entry threshold, interaction data from the item can be removed and not used in further activities in method 400. In various embodiments, category interaction data can comprise interaction data as described in activities 402-403.

In many embodiments, method 400 can comprise an activity 503 of estimating a ROS for each item in a hierarchical category. In some embodiments, a hierarchical category can comprise a hierarchical category as incorporated in activity 403. In many embodiments, method 400 can comprise an activity 504 of setting a ROS threshold. In some embodiments, an ROS threshold can comprise a maximum value for a machine learned prediction, as described below. In these or other embodiments, an ROS threshold can comprise a Minimum value for a machine learned prediction.

In many embodiments, method 400 can comprise an activity 505 of determining a maximum value for a machine learned prediction using a ROS threshold. In various embodiments, activity 505 can be performed after activity 502. In some embodiments, activity 505 can comprise optional activities 506 and 507. Accordingly, in embodiments when activity 505 is performed after activity 502, an uncertainty of a ROS estimation can be minimized. In many embodiments, method 400 can comprise an activity 506 of filtering category interaction data. In some embodiments, activity 506 can be performed in parallel and/or a part of activity 505. In various embodiments, filtering category interaction data can comprise removing entries from the category interaction data such that a conditional probability of a machine learned prediction having a ROS below a ROS threshold is minimized. In many embodiments, filtering category interaction data can comprise removing all category interaction data for items with a ROS, as estimated, below a predetermined threshold value. In many embodiments, method 400 can comprise an activity 507 of setting a maximum value for a machine learned prediction using remaining machine learned predictions. In some embodiments, remaining machine learned predictions can comprise machine learned predictions for items remaining after the filtering step above. In various embodiments, a maximum value for a machine learned prediction can be set at a highest or a lowest value of remaining machine learned.

Figure 6:
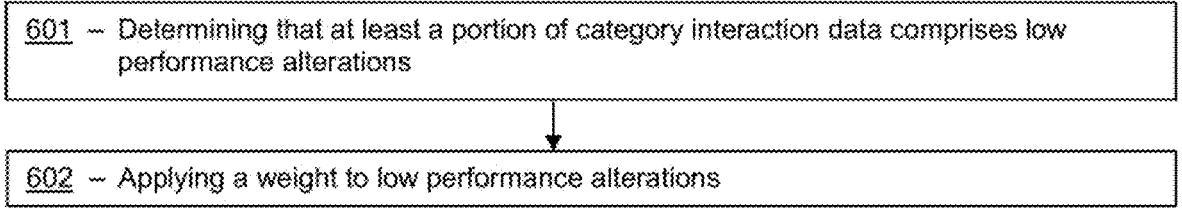
FIG. 6 illustrates a further flowchart for the method of FIG. 4, according to certain embodiments.

Turning ahead in the drawings, FIG. 6 illustrates a further flow chart for method 400, according to an embodiment. In many embodiments, the activities in this further flow chart for method 400 can be performed before or after activity 408 (FIG. 4). Method 400 (including the activities in FIGS. 4 and 6, and optionally further including the activities in FIG. 5)

is merely exemplary and is not limited to the embodiments presented herein. Method 400 (including the activities in FIGS. 4 and 6, and optionally further including the activities in FIG. 5) can be employed in many different embodiments or examples not specifically depicted or described herein. In some embodiments, the activities of method 400 (including the activities in FIGS. 4 and 6, and optionally further including the activities in FIG. 5) can be performed in the order presented. In other embodiments, the activities of method 400 (including the activities in FIGS. 4 and 6, and optionally further including the activities in FIG. 5) can be performed in any suitable order. In still other embodiments, one or more of the activities of method 400 (including the activities in FIGS. 4 and 6, and optionally further including the activities in FIG. 5) can be combined or skipped. In many embodiments, system 300 (FIG. 3) can be suitable to perform method 400 (including the activities in FIGS. 4 and 6, and optionally further including the activities in FIG. 5) and/or one or more of the activities of method 400 (including the activities in FIGS. 4 and 6, and optionally further including the activities in FIG. 5). In these or other embodiments, one or more of the activities of method 400 (including the activities in FIGS. 4 and 6, and optionally further including the activities in FIG. 5) can be implemented as one or more computer instructions configured to run at one or more processing modules and configured to be stored at one or more non-transitory memory storage modules. Such non-transitory memory storage modules can be part of a computer system such as web server 310 and/or requester computer 360 and/or requester computer 360 (FIG. 3). The processing module(s) can be similar or identical to the processing module(s) described above with respect to computer system 100 (FIG. 1). In some embodiments, method 400 (including the activities in FIGS. 4 and 6, and optionally further including the activities in FIG. 5) can be performed in parallel, before, after, or as a part of method 400 (including the activities in FIGS. 4 and 6, and optionally further including the activities in FIG. 5). In various embodiments, one or more activities of method 400 (including the activities in FIGS. 4 and 6, and optionally further including the activities in FIG. 5) can be inserted into and/or combined with all of or portions of method 400 (including the activities in FIGS. 4 and 6, and optionally further including the activities in FIG. 5).

In many embodiments, method 400 can comprise an activity 601 of determining that at least a portion of category interaction data comprises low performance alterations. In various embodiments, a low performance alteration can comprise an alteration where a decrease in ROS is due to an anomaly event. For example, when the 2019 Notre-Dame fire happened, many users searched for related keywords on search engines, and interacted with search engine marketing advertisements for Notre-Dame prints that lead the users to an eCommerce website. Many of these users did not make a purchase of the prints, but ROAS was lost due to the increased advertisement spend from increased interactions with the search engine marketing advertisements. In some embodiments, low performance altercations can be determined using a set of rules. In these or other embodiments, a set of rules can comprise a machine learning algorithm configured to output a probability of an alteration being a low performance alteration or not a low performance alteration. In these or other embodiments, a set of rules can comprise a binary classifier (e.g., an XGBoost classifier, LightGBM, catboost, etc.). In many embodiments, a machine learning algorithm configured to output a probability of an alteration being a low performance alteration or not a low performance alteration can be trained on one or more training datasets. In these or other embodiments, one or more training datasets can comprise features of total revenue, revenue per click, number of orders, number of clicks, cost per click and ROS for an individual alteration in the last k weeks. In some embodiments, k is in a range of 1 to 4 (inclusive). In these or other embodiments, a machine learned algorithm can continually discard old and receive new training data as time progresses while maintaining a corpus of k weeks' worth of training data. In many embodiments, new training data can be received in disbursements at two week intervals.

In many embodiments, method 400 can comprise an activity 602 of applying a weight to low performance alterations. In some embodiments, a weight can be configured to decrease an influence of a low performance alteration on a determination of an initial machine learned prediction for an item. In many embodiments, a weight can be calculated using an equation. In these embodiments, the equation can comprise:

$$p_{discount} = \sqrt{\frac{p_{rev}}{p_{spend}}}$$

In many embodiments, $p_{discount}$ can comprise the weight, $p_{rev}$ can comprise a revenue percentage of a low performance alteration, and $p_{spend}$ can comprise a spend percentage of the low performance alteration.

Figure 7:
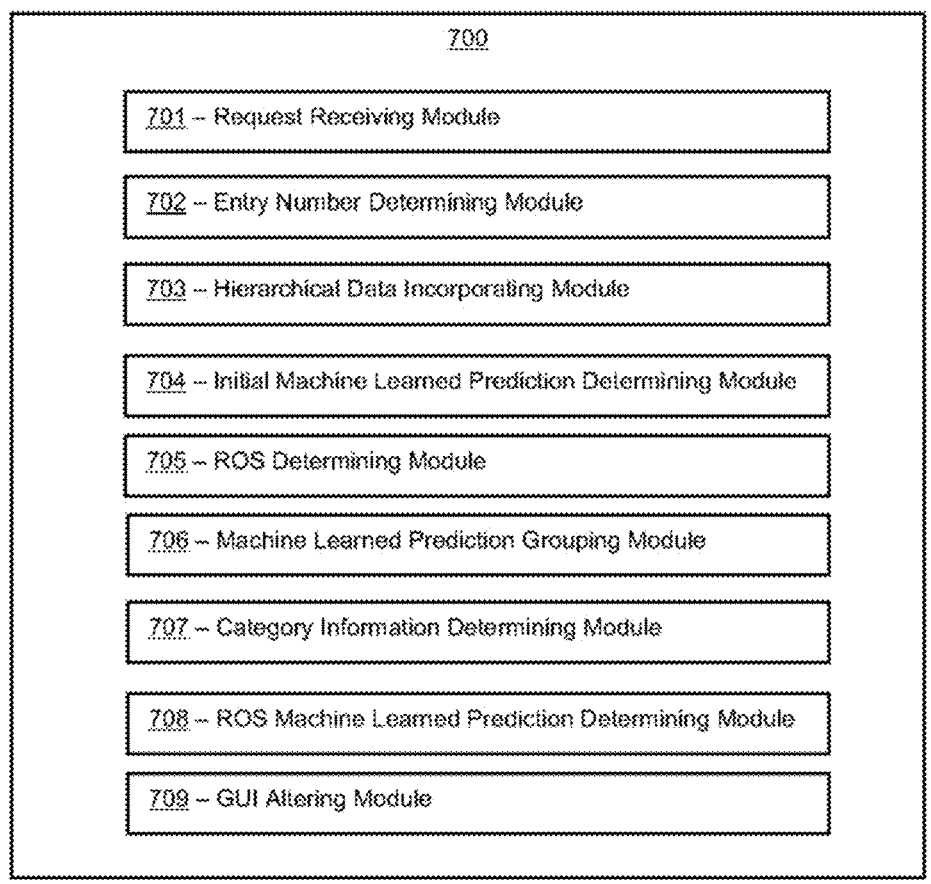
FIG. 7 illustrates a representative block diagram of a system, according to an additional embodiment.

Turning ahead in the drawings, FIG. 7 illustrates a block diagram of a system 700 that can be employed for behavior based messaging. System 700 is merely exemplary and embodiments of the system are not limited to the embodiments presented herein. System 700 can be employed in many different embodiments or examples not specifically depicted or described herein. In some embodiments, certain elements or modules of system 700 can perform various procedures, processes, and/or activities. In these or other embodiments, the procedures, processes, and/or activities can be performed by other suitable elements or modules of system 700.

Generally, therefore, system 700 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 700 described herein.

In many embodiments, system 700 can comprise non-transitory memory storage module 701. Memory storage module 701 can be referred to as request receiving module 701. In many embodiments, request receiving module 701 can store computing instructions configured to run on one or more processing modules and perform one or more acts of method 400 (FIG. 4) (e.g., activity 401 (FIG. 4)).

In many embodiments, system 700 can comprise non-transitory memory storage module 702. Memory storage module 702 can be referred to as entry number determining module 702. In many embodiments, entry number determining module 702 can store computing instructions configured to run on one or more processing modules and perform one or more acts of method 400 (FIG. 4) (e.g., activity 402 (FIG. 4)).

In many embodiments, system 700 can comprise non-transitory memory storage module 703. Memory storage module 703 can be referred to as hierarchical data incorporating module 703. In many embodiments, hierarchical data incorporating module 703 can store computing instructions configured to run on one or more processing modules and perform one or more acts of method 400 (FIG. 4) (e.g., activity 403 (FIG. 4)).

In many embodiments, system 700 can comprise non-transitory memory storage module 704. Memory storage module 704 can be referred to as initial machine learned prediction determining module 704. In many embodiments, initial machine learned prediction determining module 704 can store computing instructions configured to run on one or more processing modules and perform one or more acts of method 400 (FIG. 4) (e.g., activity 404 (FIG. 4)).

In many embodiments, system 700 can comprise non-transitory memory storage module 705. Memory storage module 705 can be referred to as ROS determining module 705. In many embodiments, ROS determining module 705 can store computing instructions configured to run on one or more processing modules and perform one or more acts of method 400 (FIG. 4) (e.g., activity 405 (FIG. 4)).

In many embodiments, system 700 can comprise non-transitory memory storage module 706. Memory storage module 706 can be referred to as machine learned prediction grouping module 706. In many embodiments, machine learned prediction grouping module 706 can store computing instructions configured to run on one or more processing modules and perform one or more acts of method 400 (FIG. 4) (e.g., activity 406 (FIG. 4)).

In many embodiments, system 700 can comprise non-transitory memory storage module 707. Memory storage module 708 can be referred to as category information determining module 707. In many embodiments, category information determining module 707 can store computing instructions configured to run on one or more processing modules and perform one or more acts of method 400 (FIG. 4) (e.g., activity 407 (FIG. 4)).

In many embodiments, system 700 can comprise non-transitory memory storage module 708. Memory storage module 708 can be referred to as ROS machine learned prediction determining module 708. In many embodiments, ROS machine learned prediction determining module 708 can store computing instructions configured to run on one or more processing modules and perform one or more acts of method 400 (FIG. 4) (e.g., activity 408 (FIG. 4)).

In many embodiments, system 700 can comprise non-transitory memory storage module 709. Memory storage module 709 can be referred to as GUI altering module 709. In many embodiments, GUI altering module 709 can store computing instructions configured to run on one or more processing modules and perform one or more acts of method 400 (FIG. 4) (e.g., activity 409 (FIG. 4)).

Figure 8:
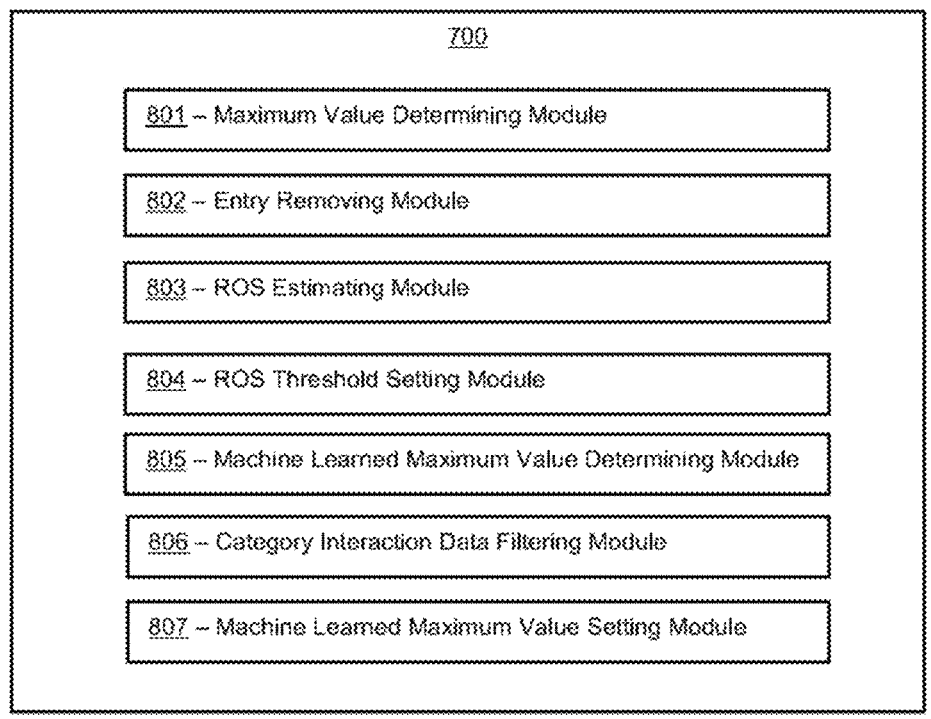
FIG. 8 illustrates a representative block diagram of additional portions of the system of FIG. 7, according to an additional embodiment.

Turning ahead in the drawings, FIG. 8 illustrates a block diagram of additional portions of system 700 that can be employed for behavior based messaging. As indicated above, system 700 (including blocks from FIGS. 7 and 8) is merely exemplary and embodiments of the system are not limited to the embodiments presented herein. System 700 (including blocks from FIGS. 7 and 8) can be employed in many different embodiments or examples not specifically depicted or described herein. In some embodiments, certain elements or modules of system 700 (including blocks from FIGS. 7 and 8) can perform various procedures, processes, and/or activities. In these or other embodiments, the procedures, processes, and/or activities can be performed by other suitable elements or modules of system 700 (including blocks from FIGS. 7 and 8).

Generally, therefore, system 700 (including blocks from FIGS. 7 and 8) can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 700 (including blocks from FIGS. 7 and 8) described herein.

In many embodiments, system 700 (including blocks from FIGS. 7 and 8) can comprise non-transitory memory storage module 801. Memory storage module 801 can be referred to as maximum value determining module 801. In many embodiments, maximum value determining module 801 can store computing instructions configured to run on one or more processing modules and perform one or more acts of method 400 (FIG. 5) (e.g., activity 501 (FIG. 5)).

In many embodiments, system 700 can comprise non-transitory memory storage module 802. Memory storage module 802 can be referred to as entry removing module 802. In many embodiments, entry removing module 802 can store computing instructions configured to run on one or more processing modules and perform one or more acts of method 400 (FIG. 5) (e.g., activity 502 (FIG. 5)).

In many embodiments, system 700 can comprise non-transitory memory storage module 803. Memory storage module 803 can be referred to as ROS estimating module 803. In many embodiments, ROS estimating module 803 can store computing instructions configured to run on one or more processing modules and perform one or more acts of method 400 (FIG. 5) (e.g., activity 503 (FIG. 5)).

In many embodiments, system 700 can comprise non-transitory memory storage module 804. Memory storage module 804 can be referred to as ROS threshold setting module 804. In many embodiments, ROS threshold setting module 804 can store computing instructions configured to run on one or more processing modules and perform one or more acts of method 400 (FIG. 5) (e.g., activity 504 (FIG. 5)).

In many embodiments, system 700 can comprise non-transitory memory storage module 805. Memory storage module 805 can be referred to as machine learned maximum value determining module 805. In many embodiments, machine learned maximum value determining module 805 can store computing instructions configured to run on one or more processing modules and perform one or more acts of method 400 (FIG. 5) (e.g., activity 505 (FIG. 5)).

In many embodiments, system 700 can comprise non-transitory memory storage module 806. Memory storage module 806 can be referred to as category interaction data filtering module 806. In many embodiments, category interaction data filtering module 806 can store computing instructions configured to run on one or more processing modules and perform one or more acts of method 400 (FIG. 5) (e.g., activity 506 (FIG. 5)).

In many embodiments, system 700 can comprise non-transitory memory storage module 807. Memory storage module 807 can be referred to as machine learned maximum value setting module 807. In many embodiments, machine learned maximum value setting module 807 can store computing instructions configured to run on one or more processing modules and perform one or more acts of method 400 (FIG. 5) (e.g., activity 507 (FIG. 5)).

Figure 9:
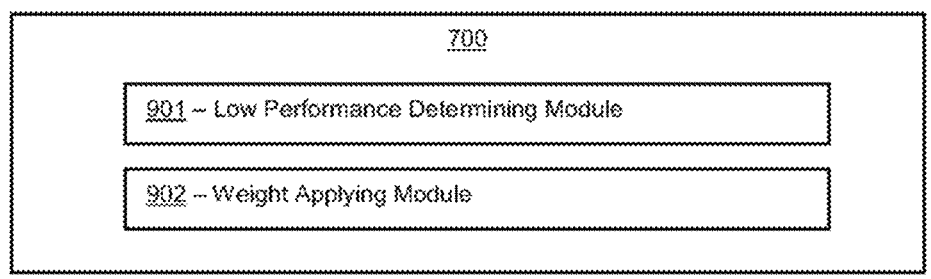
FIG. 9 illustrates a representative block diagram of further portions of the system of FIG. 7, according to an additional embodiment.

Turning ahead in the drawings, FIG. 9 illustrates a block diagram of further portions of system 700 that can be employed for behavior based messaging. As indicated previously, system 700 (including blocks from FIGS. 7, 8, and/or 9) is merely exemplary and embodiments of the system are not limited to the embodiments presented herein. System 700 (including blocks from FIGS. 7, 8, and/or 9) can be employed in many different embodiments or examples not specifically depicted or described herein. In some embodiments, certain elements or modules of system 700 (including blocks from FIGS. 7, 8, and/or 9) can perform various procedures, processes, and/or activities. In these or other embodiments, the procedures, processes, and/or activities can be performed by other suitable elements or modules of system 700 (including blocks from FIGS. 7, 8, and/or 9).

Generally, therefore, system 700 (including blocks from FIGS. 7, 8, and/or 9) can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 700 (including blocks from FIGS. 7, 8, and/or 9) described herein.

In many embodiments, system 700 can comprise non-transitory memory storage module 901. Memory storage module 901 can be referred to as low performance determining module 901. In many embodiments, low performance determining module 901 can store computing instructions configured to run on one or more processing modules and perform one or more acts of method 400 (FIG. 6) (e.g., activity 601 (FIG. 6)).

In many embodiments, system 700 can comprise non-transitory memory storage module 902. Memory storage module 902 can be referred to as weight applying module 902. In many embodiments, weight applying module 902 can store computing instructions configured to run on one or more processing modules and perform one or more acts of method 400 (FIG. 6) (e.g., activity 602 (FIG. 6)).

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory computer-readable storage devices storing computing instructions configured to run on the one or more processors and perform:
   receiving a request for a machine learned prediction for an item;
   determining that a number of entries in item user interaction data of the item is below a predetermined number-of-entries threshold;
   incorporating category interaction data of a hierarchical category of the item from a predetermined time period into the item user interaction data of the item;
   determining an initial machine learned prediction for the item using at least the category interaction data, as incorporated into the item user interaction data; and
   facilitating altering a graphical user interface (GUI) of an electronic device using the initial machine learned prediction for the item.

2. The system of claim 1, wherein the one or more non-transitory computer-readable storage devices storing computing instructions are further configured to run on the one or more processors and perform:
   determining, using at least the category interaction data, as incorporated into the item user interaction data, a maximum value for the machine learned prediction.

3. The system of claim 2, wherein determining, using at least the category interaction data, as incorporated into the item user interaction data, the maximum value for the machine learned prediction comprises:
   removing at least one entry from the category interaction data when the at least one entry is below a predetermined at-least-one-entry threshold;
   estimating, using the category interaction data, as incorporated into the item user interaction data, a respective return on spend (ROS) for each respective item in the hierarchical category;
   setting a ROS threshold value; and
   after removing the at least one entry from the category interaction data, determining the maximum value for the machine learned prediction using the ROS threshold value.

4. The system of claim 3, wherein the maximum value for the machine learned prediction comprises a highest machine learned prediction with a ROS below the ROS threshold value.

5. The system of claim 3, wherein determining the maximum value for the machine learned prediction using the ROS threshold value comprises:
   filtering the category interaction data, as incorporated into the item user interaction data, such that a conditional probability of choosing a respective machine learned prediction of one or more remaining machine learned predictions is minimized; and
   setting the maximum value for the machine learned prediction as a highest value for the machine learned prediction of the one or more remaining machine learned predictions.

6. The system of claim 1, wherein determining the initial machine learned prediction for the item using at least the category interaction data, as incorporated into the item user interaction data, comprises:
   determining a return on spend (ROS) goal;
   grouping each past machine learned prediction of one or more past machine learned predictions for the hierarchical category into a respective group of one or more groups based on a respective cost of the respective past machine learned prediction;
   determining when the category interaction data of the hierarchical category is above a predetermined category-interaction-data threshold; and
   when the category interaction data of the hierarchical category is above the predetermined category-interaction-data threshold, determining the initial machine learned prediction for the item using the ROS goal and at least one group of the one or more groups.

7. The system of claim 6, wherein determining the initial machine learned prediction for the item using the ROS goal comprises:

determining an average machine learned prediction using each machine learned prediction having a ROS above the ROS goal; and using the average machine learned prediction as the initial machine learned prediction.

8. The system of claim 1, wherein the one or more non-non-transitory computer-readable storage devices storing computing instructions are further configured to run on the one or more processors and perform:

determining, using a first set of rules, that at least a portion of the category interaction data of the hierarchical category comprises low performance alterations; and applying a weight to the low performance alterations, the weight configured to lessen an influence of the low performance alterations in determining the initial machine learned prediction for the item.

9. The system of claim 8, wherein the first set of rules comprises a binary classifier.

10. The system of claim 8, wherein the weight is determined using a revenue percentage and a spending percentage for the low performance alterations.

11. A method implemented via execution of computing instructions configured to run at one or more processors and configured to be stored at non-transitory computer-readable media, the method comprising:

receiving a request for a machine learned prediction for an item;

determining that a number of entries in item user interaction data of the item is below a predetermined number-of-entries threshold;

incorporating category interaction data of a hierarchical category of the item from a predetermined time period into the item user interaction data of the item;

determining an initial machine learned prediction for the item using at least the category interaction data, as incorporated into the item user interaction data; and facilitating altering a graphical user interface (GUI) of an electronic device using the initial machine learned prediction for the item.

12. The method of claim 11, wherein the method further comprises:

determining, using at least the category interaction data, as incorporated into the item user interaction data, a maximum value for the machine learned prediction.

13. The method of claim 12, wherein determining, using at least the category interaction data, as incorporated into the item user interaction data, the maximum value for the machine learned prediction comprises:

removing at least one entry from the category interaction data when the at least one entry is below a predetermined at-least-one-entry threshold;

estimating, using the category interaction data, as incorporated into the item user interaction data, a respective return on spend (ROS) for each respective item in the hierarchical category;

setting a ROS threshold value; and after removing the at least one entry from the category interaction data, determining the maximum value for the machine learned prediction using the ROS threshold value.

14. The method of claim 13, wherein the maximum value for the machine learned prediction comprises a highest machine learned prediction with a ROS below the ROS threshold value.

15. The method of claim 13, wherein determining the maximum value for the machine learned prediction using the ROS threshold value comprises:

filtering the category interaction data, as incorporated into the item user interaction data, such that a conditional probability of choosing a respective machine learned prediction of one or more remaining machine learned predictions is minimized; and setting the maximum value for the machine learned prediction as a highest value for the machine learned prediction of the one or more remaining machine learned predictions.

16. The method of claim 11, wherein determining the initial machine learned prediction for the item using at least the category interaction data, as incorporated into the item user interaction data, comprises:

determining a return on spend (ROS) goal;

grouping each past machine learned prediction of one or more past machine learned predictions for the hierarchical category into a respective group of one or more groups based on a respective cost of the respective past machine learned prediction;

determining when the category interaction data of the hierarchical category is above a predetermined category-interaction-data threshold; and when the category interaction data of the hierarchical category is above the predetermined category-interaction-data threshold, determining the initial machine learned prediction for the item using the ROS goal and at least one group of the one or more groups.

17. The method of claim 16, wherein determining the initial machine learned prediction for the item using the ROS goal comprises:

determining an average machine learned prediction using each machine learned prediction having a ROS above the ROS goal; and using the average machine learned prediction as the initial machine learned prediction.

18. The method of claim 11, wherein the method further comprises:

determining, using a first set of rules, that at least a portion of the category interaction data of the hierarchical category comprises low performance alterations; and applying a weight to the low performance alterations, the weight configured to lessen an influence of the low performance alterations in determining the initial machine learned prediction for the item.

19. The method of claim 18, wherein the first set of rules comprises a binary classifier.

20. The method of claim 18, wherein the weight is determined using a revenue percentage and a spending percentage for the low performance alterations.

* * * * *